(12) United States Patent
Lu et al.

(10) Patent No.: US 12,025,741 B2
(45) Date of Patent: Jul. 2, 2024

(54) THREE-DIMENSIONAL SCANNING LiDAR BASED ON ONE-DIMENSIONAL OPTICAL PHASED ARRAYS

(71) Applicant: Shanghai Jiao Tong University, Shanghai (CN)

(72) Inventors: Liangjun Lu, Shanghai (CN); Weihan Xu, Shanghai (CN); Linjie Zhou, Shanghai (CN); Jianping Chen, Shanghai (CN); Jiao Liu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 917 days.

(21) Appl. No.: 17/060,052

(22) Filed: Sep. 30, 2020

(65) Prior Publication Data

US 2021/0018599 A1    Jan. 21, 2021

Related U.S. Application Data

(63) Continuation of application No. PCT/CN2019/087748, filed on May 21, 2019.

(30) Foreign Application Priority Data

May 5, 2019   (CN) .......................... 201910367089.8

(51) Int. Cl.
*G01S 7/481* (2006.01)
*G01S 17/42* (2006.01)

(52) U.S. Cl.
CPC .......... *G01S 7/4815* (2013.01); *G01S 7/4816* (2013.01); *G01S 7/4817* (2013.01); *G01S 17/42* (2013.01)

(58) Field of Classification Search
None
See application file for complete search history.

(56) References Cited

U.S. PATENT DOCUMENTS 10,698,291 B2   6/2020   Zhuromskyy et al.
2016/0084946 A1*  3/2016   Turbide ................. G01S 7/497
                                      356/4.01

(Continued)

FOREIGN PATENT DOCUMENTS

CN    105527772 A    4/2016
CN    106410607 A    2/2017

(Continued)

OTHER PUBLICATIONS

Skinner, Wilbert R., "A comparative study of coherent & incoherent doppler Lidar Techniques", (published 1994), pp. 48-50. (Year: 1994).*

(Continued)

*Primary Examiner* — Eric L Bolda
(74) *Attorney, Agent, or Firm* — Mei & Mark LLP; Manni Li

(57) ABSTRACT

A three-dimensional scanning LiDAR based on one-dimensional optical phased arrays comprises a transmitting end, a coherent receiving end and an incoherent receiving end, wherein the transmitting end, the coherent receiving end and the incoherent receiving end are all one-dimensional arrays. A phase control complexity of the three-dimensional scanning phased array is reduced, and a tunable laser with high cost and a grating array antenna with large crosstalk are avoided. The LiDAR provides pure solid-state three-dimensional scanning in speed and integration level and is highly practical.

18 Claims, 8 Drawing Sheets

(56) References Cited

U.S. PATENT DOCUMENTS

| | | | |
|---|---|---|---|
| 2016/0282468 A1* | 9/2016 | Gruver | ........... H05K 999/99 |
| 2018/0188452 A1 | 7/2018 | Sun et al. | |
| 2019/0094366 A1 | 3/2019 | Maleki et al. | |
| 2019/0265574 A1 | 8/2019 | Skirlo et al. | |
| 2020/0127432 A1 | 4/2020 | Vermeulen et al. | |
| 2020/0158956 A1 | 5/2020 | Lipson et al. | |
| 2020/0217961 A1 | 7/2020 | Russo et al. | |
| 2020/0225415 A1 | 7/2020 | Lipson et al. | |
| 2020/0225558 A1 | 7/2020 | Lipson et al. | |

FOREIGN PATENT DOCUMENTS

| | | | |
|---|---|---|---|
| CN | 108646430 | A | 10/2018 |
| CN | 108693504 | A | 10/2018 |
| CN | 108761439 | A | 11/2018 |
| CN | 108761955 | A | 11/2018 |
| CN | 108896977 | A | 11/2018 |
| CN | 108957900 | A | 12/2018 |
| CN | 109270550 | A | 1/2019 |
| CN | 109444851 | A | 3/2019 |

OTHER PUBLICATIONS

Webpage https://en.wikipedia.org/wiki/Charge-coupled_device , retrieved on Sep. 14, 2023. (Year: 2023).*

Webpage https://en.wikipedia.org/wiki/Single-photon_avalanche_diode, retrieved on Sep. 14, 2023. (Year: 2023).*

Karel Van Acoleyen et al., "Off-chip beam steering with a one-dimensional optical phased array on silicon-on-insulator," Optics Letters, vol. 34, No. 9, pp. 1477-1479 (May 1, 2009).

Jie Sun et al., "Large-scale nanophotonic phased array," Nature, vol. 493, pp. 195-199 (Jan. 10, 2013).

J. C. Hulme et al., "Fully integrated hybrid silicon two dimensional beam scanner," Optics Express, vol. 23, No. 5, pp. 5861-5874 (2015).

David N. Hutchinson et al., "High-resolution aliasing-free optical beam steering," Optica, vol. 3, No. 8, pp. 887-890 (Aug. 2016).

Christopher V. Poulton et al., "Large-scale silicon nitride nanophotonic phased arrays at infrared and visible wavelengths," Optics Letters, vol. 42, No. 1, pp. 21-24 (Jan. 1, 2017).

Christopher V. Poulton et al., "Coherent solid-state LIDAR with silicon photonic optical phased arrays," Optics Letters, vol. 42, No. 20, pp. 4091-4094 (Oct. 15, 2017).

Yu Zhang et al., "Sub-wavelength-pitch silicon-photonic optical phased array for large field-of-regard coherent optical beam steering," Optics Express, vol. 27, No. 3, pp. 1929-1940 (Feb. 4, 2019).

Moshe Zadka et al., "On-chip platform for a phased array with minimal beam divergence and wide field-of-view," Optics Express, vol. 26, No. 3, pp. 2528-2534 (Feb. 5, 2018).

Weiqiang Xie et al., "Heterogeneous silicon photonics sensing for autonomous cars [Invited]," Optics Express, vol. 27, No. 3, pp. 3642-3663 (Feb. 4, 2019).

Zhuang, Dongwei et al., "Omnidirectional beam steering using aperiodic optical phased array with high error margin," Optics Express, vol. 26, No. 15, pp. 19154-19170 (Jul. 23, 2018).

Tin Komljenovic et al., "On-chip calibration and control of optical phased arrays," Optics Express, vol. 26, No. 3, pp. 3199-3210 (Feb. 5, 2018).

* cited by examiner

THREE-DIMENSIONAL SCANNING LiDAR BASED ON ONE-DIMENSIONAL OPTICAL PHASED ARRAYS

CROSS-REFERENCE TO RELATED APPLICATIONS

The subject application is a continuation of PCT/CN2019/087748 filed on May 21, 2019, which claims priority on Chinese Application No. CN201910367089.8 filed on May 5, 2019 in China. The contents and subject matter of the PCT international application and the Chinese priority application are incorporated herein by reference.

TECHNICAL FIELD

The present invention belongs to the field of light detection and ranging (LiDAR), and particularly relates to a three-dimensional scanning LiDAR based on a one-dimensional optical phased arrays (OPAs).

BACKGROUND ART

As the automatic driving technology evolves, its applications in Advanced Driving Assistant System (ADAS) and Robotic Cars are coming to the critical stage of marketization. Accurate real-time sensing of the environment around a vehicle is not only an application requirement but also a key factor for traffic safety and market confidence. Under the background of sensor fusion, the LiDAR increasingly becomes an indispensable core device in the automatic driving because of its ultra-high resolution, active luminescence detection, and mature point cloud modeling. By emitting detection light and receiving the reflected signal light, a LiDAR can detect a target and retrieve its range. Meanwhile, by detecting and ranging over the entire field of view, the surrounding environment can be imaged. There are many implementations of the detection and imaging. From the perspective of the hardware layer, the detection can be approximately divided into coherent detection and incoherent detection, which affects the accuracy of the radial ranging resolution; the imaging can be divided into scanning imaging and non-scanning imaging, which determines the real-time performance of angular frame-rate. In the early stage of LiDAR development, the detection schemes are fully developed yielding a large number of engineering applications, while the imaging has been implemented mainly by mechanical scanning. As the mechanical system has moving parts, issues such as mechanical wear, structural reliability, precision in motion control, and the influence of inertia in acceleration environment, make it difficult for the mechanical scanning scheme to achieve high-speed and large-angle beam rotation at the same time. In addition, the mechanical scanning solutions suffer significantly in terms of volume and power consumption.

To improve the performance and productivity through miniaturization and integration and to achieve higher market share based on higher cost efficiency, some hybrid solid-state solutions based on Micro-Electro-Mechanical System (MEMS) mirrors have been actively developed by the industry. However, the hybrid solid-state systems still contain moving parts, moreover, they face significant resonance and deformation problems in high-speed operation, which limit the improvement in detecting speed. In addition, as the mechanical scanning is a continuous process and the detection directions at two adjacent instants cannot be abruptly changed, the detection resources cannot be flexibly allocated. On the other hand, non-scanning LiDAR, which is similar to the camera in principle, can not allocate detection resources flexibly either. In addition, the solution requires a large-scale 2-D array sensor with high responsivity and low noise. As the complexity of the array scaled quadratically in relation to the detection fineness, it is difficult for the solution to realize high-resolution and high-real-time environment sensing at the same time. Finally, as the "laser flash" needs to illuminate the entire field of view, in a medium to long working distance required for automatic driving applications, such solution creates another pair of trade-off between sensor cost and detection range.

Accordingly, the pure solid-state scanning solution not only avoids the problem of the mechanical parts which constitutes a limitation on the scanning speed, but also concentrates the power of detection in a digitally changed detection direction with extremely high directional gain by means of flexible beam forming, thereby breaking the trade-off originated from the imaging principle in other solutions. Nonetheless, whether based on a switching gating mode of a group of collimated discrete transceiving elements or the optical phased array technology, the element complexity required in the three-dimensional scanning still increases quadratically $O(n^2)$ with respect to the required angular resolution, which is also the main thrust that advocate the adoption of the hybrid architecture that combines wavelength tuning and one-dimensional optical phased array for two dimensional beam manipulation. By changing the input wavelength of the tunable laser, the emitting angle of the grating antenna will change along with the wavelength; subsequently, the aforementioned grating antennas are arranged side by side to form a one-dimensional phased array so that angular scanning can be realized in another angular direction by changing the phase relationship among the array elements, and eventually the task of three-dimensional scanning is realized at a complexity of $O(n+1)$.

The architecture, i.e. the hybrid architecture, was first demonstrated by the researcher from Interuniversity Micro-Electronics Center (IMEC) and Ghent University in 2009 (See Optics Express Vol. 34, No. 9, pp. 1477-1479, 2009). Following up to this work, Massachusetts Institute of Technology reported a large-scale two-dimensional array (See Nature, Vol. 493, pp. 195-199, 2013) verifying the capability of optical phased arrays to form arbitrary patterns in the far field. On one hand, this publication demonstrated the feasibility to realize large scale OPAs with the state-of-art fabrication process as well as the beam-forming flexibility of an OPA; on the other hand, the issues related to the control complexity of two-dimensional phased arrays is exposed as well.

In 2015, researchers from UC Santa Barbara reported an OPA of hybrid architecture, incorporating an on-chip laser based on their silicon-III/V heterogeneous integration process. As shown in Optics Express, Vol. 23, No. 5, pp. 195-199, 2015, they reported the first OPA-based three-dimensional scanning transmitter integrated with on-chip light source.

In 2016, Intel Corporation continued to promote the silicon photonic platform for the on-chip integration of hybrid architecture OPAs and reported a large-scale aliasing-free sparse phased array with high performance in Optica, Vol. 3, No. 8, pp. 887-890, 2016. The work made a significant breakthrough both in terms of a large scanning range and a large number of resolvable points, and the beam divergence is reduced to 0.14° on both axes of rotation, demonstrating a performance comparable to the collimation system in traditional mechanical LiDARs.

In 2017, MIT reported a large-scale passive array based on the silicon nitride platform (Optics Letter, Vol. 42, No. 1, pp. 21-24, 2017) together with a silicon-based integrated LiDAR system with frequency-modulated continuous wave (FMCW) detection scheme (Optics Letter, Vol. 42, No. 20, pp. 4091-4094, 2017), the former breaks the record by reducing the beam divergence down to 0.02° and the latter realizes a fully-integrated LiDAR transceiver of a paraxial arrangement while also incorporating a germanium-silicon detector. It should be noted that both these two works still adopted the hybrid scheme, and the combination of wavelength tuning together with one-dimensional phased array for two dimensional beam-steering has become the de-facto standard.

Over the years, other contributions are made and being made to the field, including the design of mm-long to cm-long grating antennas by depositing silicon nitride material directly on the silicon waveguide (European Conference on Optical Communication (ECOC), DOI: 10.1109/ECOC. 2018.8535530; Optics Express, Vol. 26, No. 3, pp. 2528-2534, 2018; US2020/0158956 A1), III-V/Si hybrid integrated electro-optic phase shifter for optical phased arrays (Opt. Express, Vol. 27, No. 3, pp. 3642-3663, 2019), automated sparse array design (Optics Express, Vol. 26, No. 15, pp. 19154-19170, 2018) and dynamic on-chip calibration techniques (Optics Express, Vol. 26, No. 3, pp. 3199-3210, 2018).

The field is also being industrialized. In 2018, INTEL published an optical phased array patent (WO/2018/125403), the solution is based on the hybrid architecture and proposed the implementation of a synthesized array with sub-arrays of quasi-periodic spacing between different sub-arrays. Relying on the vernier effect, the sparse array reduce the side lobe level by undermining the constructive interference conditions at grating lobes other than the main lobe and subsequently achieving large-scale aliasing-free operation.

Patents are also filed to secure the rights of innovation for switch-based beam-steerer based on multiple emitters collimated with on-chip polysilicon lens and grating (US2019/0265574 A1), for crosstalk suppression in densely packed OPAs with k-vector mismatch and metamaterial rods (US2020/0225558 A1), for low-power consumption thermal phase shifters based on light recycling structures (US2020/0225415 A1), for OPA-based multi-aperture LiDAR transceiver (US2020/0217961 A1), for a thermal beam radiator by combining a grating-based external cavity laser together with an emitting grating antenna (US2020/0127432 A1), and for optical phased arrays organized on a two-dimensional lattice (U.S. Pat. No. 10,698,291 B2)

Similarly, from 2018, patent applications in China on OPAs or laser phased arrays began to gradually increase, among which, a "single-wavelength multi-line scanning system based on thermo-optic switch and silicon-optic phased array" (CN201810240144) proposed a new architecture for realizing single-wavelength multi-linear scanning by using thermo-optic switch to route detection light to sub-arrays of different grating periods. Although the patent did not use a wavelength tunable laser, as the number of lines increases, the switch size, the number of subarrays, and the complexity of the control circuit amount to large scale and high cost, and eventually will again reaching a complexity of $O(n^2)$. Therefore, the architecture will be limited with a tradeoff between the number of available resolvable points, the overall complexity, and the on-chip insertion loss.

Chinese patents entitled "wavelength-division-multiplexing-based integrated multi-beam optical phased array delay network" (CN201810424574) and "silicon-based multi-beam optical phased array antenna" (CN201810695911) propose implementations of multi-beam optical phased array from two technical paths, respectively. Nevertheless, these works mainly focus on how to add a photonic feeding structure before the phased array to achieve more complex beam control functions. The design of the optical phased array itself and the construction of the LiDAR system are not given in details.

Chinese patents entitled "chip-scale optical phased array transmitter based on metal slot waveguides" (CN201810619456) and "wide-range scanning broadband laser phased array system" (CN201810558205) adopt different optical antennas and decoupling designs, so that the array pitch is reduced to be half to one wavelength. Therefore, the integration density of the transmitting end antenna is improved and large-range aliasing-free beam-steering is realized. However, since the angular resolution of the phased array is inversely proportional to the total size of the phased array, the total number of antennas inside a high-density integrated OPA can reach thousands to tens of thousands in order to compete with the collimation system in traditional scanning LiDAR with respect to far field resolution, and subsequently the complexity of the control circuit and the burden of the master computer are greatly increased.

Chinese Patent entitled "photonic-integrated chip-scale active optical phased array and its fabrication methods" (CN201611027155) mainly introduces the fabrication process of photonic phased array based on III/V platform. Because the refractive index difference between the core layer and the cladding layer of the III/V platform waveguide is much smaller than that of silicon platform, the mode distribution in the III/V dielectric waveguide is wider, the device size and bending radius are both larger, the evanescent coupling between channels is more serious, and the unit area cost of a III/V chip is significant. Due to the issues above, the theoretical performance of this platform is not appealing to chip design, and there is no significant advantage to integrate the optical phased arrays on III/V platform.

To conclude, most of the academic work has been based on the hybrid architecture. However, the issues with this standard architecture are significant. Due to the fact that the optical phased array realizes beam forming through interference, the round-trip optical path between the detection target and the emitter needs to be within the coherence length, i.e. the laser is required to have the a narrow line width. Meanwhile, as the angle tuning efficiency of the grating antenna is generally limited, the laser needs to tunable over a wide-range of wavelength. Finally, the laser needs to support a high power output for LiDAR applications. Note that these performance requirements should be met simultaneously, while it must be feasible on the C-band integrated optical platform originally optimized for optical communication applications, therefore, the cost of such a laser is obviously significant due to various rigorous requirements.

In addition, since the number of resolvable points for the corresponding direction of wavelength tuning is directly proportional to the number of periods of the grating antenna, which may need to reach several centimeters in order to achieve lower beam divergence, for a grating antenna of that length, process errors will result in the accumulation of random phase errors and significant losses. Moreover, when these long antennas are juxtaposed to form a phased array, the finite mode field confinement of dielectric waveguides will result in phase crosstalk between adjacent channels, and subsequently resulting in a tradeoff between the effective scanning range in the direction scanned by the phased array and the effective beam divergence in the direction scanned by the grating antenna. Finally, the passive grating antenna array also occupies a large chip area, and the overall cost of the chip system is relatively high.

SUMMARY OF THE PRESENT INVENTION

To mitigate the defects of the current technology, the present invention provides a three-dimensional scanning LiDAR that is based on one-dimensional optical phased arrays, which is an integrated optical chip system.

On the hardware level, the present invention is LiDAR orientated, and is based on the photonic integration platform. The design aims to simultaneously reduces design difficulty and component cost by means of transceiving complexity decomposition. The present invention realizes transceiving with phased-array-based directional selectivity and adopt both a coherent detection and an incoherent detection methods in conjunction to fully exert the core advantages of a pure solid-state scanning.

On the system level, the present invention is a terminal sensing device, wherein the LiDAR data can be provided for specific tasks by complementing and configuring an external light source and a control circuit, so that flexible transformation and multi-sensor fusion can be carried out according to application requirements and installation, with a modularization characteristic.

Finally, the present invention has obvious advantages in the aspects of scanning speed, processing cost, overall power consumption, system size, and is of high application value.

The present invention provides a three-dimensional scanning LiDAR based on one-dimensional optical phased arrays, comprising a single-wavelength narrow line width laser light source (12), a high-speed integrated circuit controller (11), a transmitting end (Tx) (16), a coherent receiving end (Rc) (15), and an incoherent receiving end (Ri) (14). The transmitting end (Tx) (16) further comprises a detection light input waveguide (101), a first beam splitter module (102), a phase shifter array module (103), and a coupling suppressed one-dimensional transmitting array of sub-wavelength pitch (104), wherein the detection light input waveguide (101), the beam splitter module (102), the phase shifter array module (103), and the coupling suppressed one-dimensional transmitting array of sub-wavelength pitch (104) are arranged in sequence along the propagation of detection light provided by the narrow line width laser light source (12). The coherent receiving end (Rc) (15) comprises a spot-size converted one-dimensional receiving array of sparse antenna pitch (201), and a coherent receiving module (204) along the propagation direction of the signal light reflected from the target. Along the propagation direction of the reference light provided by the narrow line width laser light source (12), the coherent receiver are organized into and a reference light input waveguide (202), a second beam splitter module (203), and the coherent receiving module (204). And finally, the incoherent receiving end (Ri) (14) comprises a space optical module (301) and a linear photodetector array (302) in sequence along the propagation direction of the signal light reflected from the target. The high-speed integrated circuit controller (11) comprises two input ends and two output ends, wherein the output end of the coherent receiving module (204) in the coherent receiving end (15) is connected electrically with the first input end of the high-speed integrated circuit controller (11) for data processing; the output end of the linear photodetector array (302) is connected electrically with the second input end of the high-speed integrated circuit controller (11) for data processing; the driving circuits of the phase shifter array module (103) in the transmitting end (16), and the driving circuits of the coherent receiving module (204) in the coherent receiving end (15), are electrically connected with the two output ends of the high-speed integrated circuit controller (11) for active phase compensation.

In the three-dimensional scanning LiDAR of the present invention, the narrow line width laser light source (12) can be co-integrated with the chip system or be provided by a separate external module, similarly, the high-speed integrated circuit controller can be 3D integrated with the chip system or be co-packaged on the final PCB module.

In the three-dimensional scanning LiDAR of the present invention, the detection light provided by the narrow line width laser light source (12) enters the chip from the detection light input waveguide (101) and is distributed into N channels of waveguides by the first beam splitter module (102), when N is less than or equal to 64, light wave amplitudes of the output channels are distributed according to the Chebyshev distribution, and when N is greater than 64, the light wave amplitudes of the channels are distributed according to the Taylor-Kaiser distribution; then the detection light passes through the phase shifter array (103) of N channels, and subsequently leaves the transmitting end (16) from the coupling suppressed one-dimensional transmitting array of sub-wavelength pitch (104) of N channels, entering the free space to irradiate the target. It should be noted that N is greater than or equal to 4, and the transmitting array is a uniform array, the sub-wavelength pitch refers to a specific value between one half of the operating wavelength to one operating wavelength, the specific value being determined by the number of channels and the scanning range, and the operating wavelength ranging from 1500 nm to 1600 nm.

In the three-dimensional scanning LiDAR of the present invention, the coherent receiving end (15), the reference light provided by the narrow line width laser light source (12) enters the chip from the reference light input waveguide (202), and the reference light power is distributed into M paths of waveguides by the second beam splitter module (203), a simple uniform amplitude distribution could be implemented, whereas a amplitude taper can also be implemented as follow: when M is less than or equal to 64, light wave amplitudes of the output channels are distributed according to the Chebyshev distribution, and when M is greater than 64, the light wave amplitudes of the channels are distributed according to the Taylor-Kaiser distribution; Note that for the amplitude taper to be implemented on a sparse array, the actual channel amplitude should be obtained through interpolation with respect to the geometric relation of array elements; and the spot-size converted one-dimensional receiving array of sparse antenna pitch (201) has M channels, and the signal light reflected by the target is coupled from the spot-size converted one-dimensional receiving array of sparse antenna pitch (201) of the M channels into a chip system, the reference light of the M channels from the second beam splitter module (203) and the signal light of the M channels of the spot-size converted one-dimensional receiving array of sparse antenna pitch (201) of the M channels from the receiving antenna are subjected to photo detection in the coherent receiving module (204) to generate an electric signal containing the target distance information. It should be noted that M is greater than or equal to 4, the receiving array is of non-uniform pitch, and a cylindrical lens (205) with the curved surface perpendicular to the array direction is adopted to improve the effective receiving area of the coherent receiving end (15).

In the three-dimensional scanning LiDAR of the present invention, at the incoherent receiving end (14), the signal light reflected from the target returns from a lens optical module of large numerical aperture (301) to the incoherent receiving end (14) and is focused onto a plane where the linear photodetector array (302) is located, and is respectively received by the linear photodetector array (302).

In the three-dimensional scanning LiDAR of the present invention, the coupling suppressed one-dimensional transmitting array of sub-wavelength pitch (104) is arranged along the horizontal direction, the directional beam obtained by the interference of the coupling suppressed one-dimensional transmitting array of sub-wavelength pitch (104) is a strip beam along the elevation direction and performs one-dimensional linear scanning in the azimuth direction; the spot-size converted one-dimensional receiving array of sparse antenna pitch (201) in the coherent receiving end (15) and the linear photodetector array (302) are both arranged along the vertical direction. According to the Helmholtz reciprocity principle, the directional selectivity of the receiving OPA and array elements of the photodetector is a strip area along the latitude direction, the former, i.e. the receiving OPA, performs one-dimensional linear scanning in the elevation angle direction, the latter, i.e. the photodetector array, simultaneously receives and distinguishes echoes from all elevation angles to realize three-dimensional scanning.

In the three-dimensional scanning LiDAR of the present invention, the first beam splitter module (102) and the second beam splitter module (203) can adopt either an array of cascaded directional couplers (206) or a star coupler (207).

In the three-dimensional scanning LiDAR of the present invention, the phase shifters in the phase shifter array module (103) and the coherent receiving module (204) adopt thermo-optic or electro-optic phase shifters, the phase shift provided by each phase shifter is controlled by the high-speed integrated circuit controller (11) through the driving circuits, the phase shifter driving circuits are monolithically integrated or implemented as a CMOS integrated circuit on another chip and subsequently packaged in a 3D co-integration format or a multi-chip package, the phase shifter driving circuit and an overall control loop are connected by high speed circuits.

In the three-dimensional scanning LiDAR of the present invention, the coupling suppressed one-dimensional transmitting array of sub-wavelength pitch (104) can adopt either a curved waveguide array structure (1042), a waveguide array structure with alternatively changing widths (1043), or a structure with metamaterial ribbons inserted between the waveguides (1044) to suppress coupling so as to realize sub-wavelength pitch arrangement.

In the three-dimensional scanning LiDAR of the present invention, the one-dimensional receiving array (201) carries out spot size conversion by using an inverted taper structure, a geometric dimension thereof shrinks from a standard rectangular waveguide to a tip of square cross-section structure limited by the process precision, and a geometric dimension of the guided mode is gradually expanded and eventually becomes polarization insensitive and thereby increasing the effective receiving area.

In the three-dimensional scanning LiDAR of the present invention, the coherent receiving module (204) simultaneously receives the reference light and the signal light by using a balanced detector, achieving coherent reception with high directional gain and high common mode rejection ratio by performing matched phase shift on the reference light, subsequently improving the signal-to-noise ratio in transceiving process. The output electrical signal contains a phase shift or a frequency shift depending on the current detection scheme and is send to a signal processing module to retrieve the distance and/or speed information of the current target.

In the three-dimensional scanning LiDAR of the present invention, the transmitting end (16) and the coherent receiving end (15) are monolithically or hybrid integrated on a silicon, a silicon nitride, or a III-V platform with 2.5D or 3D integration.

In the three-dimensional scanning LiDAR of the present invention, the linear photodetector array (302) performs photo detection using an array of single-photon avalanche diodes in a CCD manner.

In the present invention, the high-speed integrated circuit module can be realized by adopting, non-exclusively, typical integrated circuits such as a field-programmable gate array (FPGA), an application-specific integrated circuit (ASIC), etc. The chip based LiDAR system and the control circuit may be optoelectronically co-packaged using a multi-chip module (MCM) or a system in a package (SIP).

The light sources may adopt, non-exclusively, typical light source implementations such as discrete narrow line width lasers with fiber connections, hybrid integrated III-V/Si narrow line width lasers based on transfer-printing, III-V bonding, or 3D integration, depending on system performance and process conditions.

Compared with the existing technology, the present invention mainly has the following beneficial effects:

1. By adopting transceiving complexity decomposition, the present invention decompose the quadratic relation $O(n^2)$ between the element complexity and scanning resolution required by three-dimensional scanning into two groups of linear relations $O(2n)$, i.e., of the transmitting end and the receiving end mutually orthogonal to each other; single-wavelength three-dimensional scanning can therefore be realized or multi-beam application can be realized with additional wavelength resources. The transceiving array with linear complexity and the linear photodetector array have remarkable advantages in cost and control circuit complexity.

2. The present invention does not contain any moving parts, the limitation of the angular refreshing rate is completely determined by the physical limit of light propagation between the LiDAR and the target, and by hitchhiking along with the development of the integrated optical communication technology, the required thermo-optic or electro-optic phase shifters or other phase shifters can be further improved in the aspects of power consumption, operation speed etc. Meanwhile, as a strict solid-state device, mechanical abrasion or deformation does not exist in the system, and stable operation can be maintained in an environment with rapid acceleration or deceleration.

3. The present invention realizes a pure solid-state three-dimensional scanning LiDAR, wherein the beam forming directions of two adjacent operating instants are independent from each other and are digitally controlled by the mast computer, so that detection resources can be flexibly allocated in the field of view, subsequently realizing intelligent detection with the capability to focus on high-value target. The burden on the rear-end data processing circuit and on the entire automatic driving system can be effectively reduced.

4. According to the present invention, the cost of optical phased array chips can be significantly reduced through large-scale batch production by means of semiconductor optoelectronic co-integration process; in addition, the present invention has the characteristic of modularization, supports different types of light sources and peripheral control circuits. The invention can not only realize an integrated chip system design, but also can form a distributed system by using a plurality of terminal sensors pairs matched with a single high-performance host where light source and control circuits are concentrated.

BRIEF DESCRIPTION OF THE DRAWINGS

FIGS. 5A and 5B show the structures of silicon nitride integrated beam splitter in one embodiment of the present invention, wherein FIG. 5A shows the structure of an array of cascaded directional couplers, and FIG. 5B shows the structure of a star coupler.

The reference numbers used in the figures refer to the following structures and terms: 10—electrical connection; 11—high speed integrated circuit controller; 12—narrow line width laser light source; 13—free space optics for light focusing; 14—incoherent receiving end (Ri); 15—coherent receiving end (Rc); 16—transmitting end (Tx); 17—signal light reflected by the target; 18—reference light; 19—detection light; 20—intersections of the directional selectivities of the Tx, the Rc and the Ri; 21—far field;

101—detection light input waveguide; 102—beam splitter module; 103—phase shifter array module; 104—coupling suppressed one-dimensional transmitting array of sub-wavelength pitch; 1040—directional beam; 1041—azimuth angle; 1042—curved waveguide array structure; 1043—waveguide array structure with alternatively changing widths; 1044—structure with metamaterial ribbons inserted between the waveguides;

201—spot-size converted one-dimensional receiving array of sparse antenna pitch; 202—reference light input waveguide; 203—beam splitter module; 204—coherent receiving module; 205—cylindrical lens/magnifying lens; 206—array of cascaded directional couplers; 207—star coupler; 2010—strip beam;

301—lens optical module of large numerical aperture; 302—linear photodetector array; 303—spherical lens/focusing lens; 304—cylindrical lens/magnifying lens; 3020—strip beam;

3311—retrieve the searching frame beam-forming look-up table for the one-dimensional optical phased array in the transmitting end; 3312—transmitting end form the beam at the current azimuth angle; 3313a—all elements in the linear photodetector array has received reflected signal light; 3313b—the total waiting time exceeds the round trip delay corresponding to the maximum detection distance; 3314—converting and recording the distances of detected targets over all elevation angles for the current azimuth angle; 3315—all azimuth angles required by the searching frame having been scanned; 3316—analyzing and synthesizing key targets; 3317—retrieve the ranging frame beam-forming look-up table [based on the targets synthesized in 3316] for the one-dimensional optical phased array in the transmitting end; 3318—the transmitting end form the beam at the current azimuth angle; 3319—retrive the coherent receiving look-up table [based on 3316] for the one-dimensional optical phased array in the receiving end; 3320—the coherent receiving end receives, calculates and records the distances of the detected targets in the corresponding elevation angles.

DETAILED DESCRIPTION OF THE PRESENT INVENTION

The present invention is described in further detail with reference to the drawings and examples. The following specific examples are for illustrative purposes only and are not intended to limit the present invention. At the same time, the technical features involved in different implementations in the embodiments may be combined with each other as long as there is no theoretic conflict in implementation.

Figure 1:
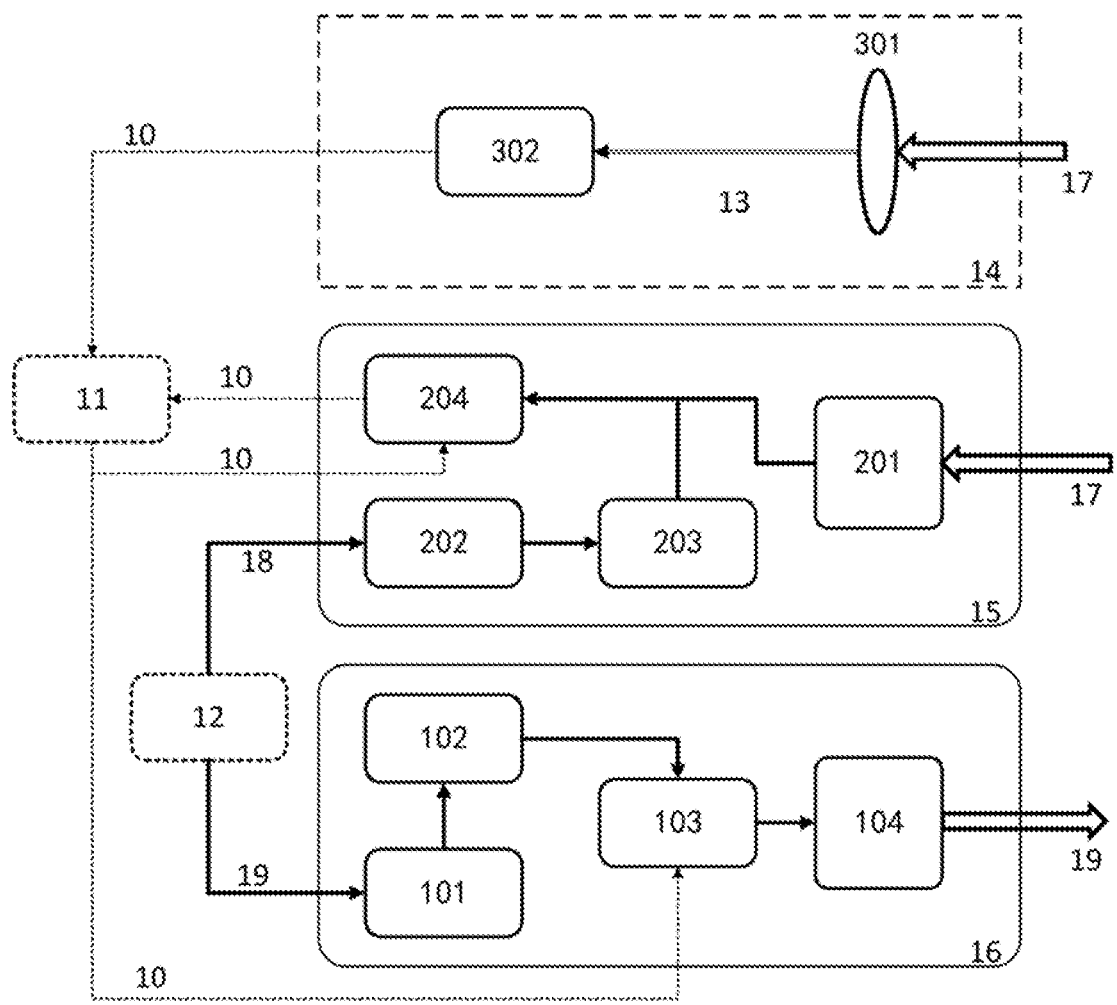
FIG. 1 is a diagram showing the system architecture of the three-dimensional scanning LiDAR based on one-dimensional optical phased arrays in the present invention.

As shown in FIG. 1, the three-dimensional scanning LiDAR based on one-dimensional optical phased arrays comprises a narrow line width laser light source and a high-speed integrated circuit controller, and is characterized by further comprising a transmitting end Tx 16, a coherent receiving end Rc 15, and an incoherent receiving end Ri 14, the transmitting end Tx 16 comprising a detection light input waveguide 101, a first beam splitter module 102, a phase shifter array module 103, and a coupling suppressed one-dimensional transmitting array of sub-wavelength pitch 104 in sequence along the propagation direction of the detection light 19 provided by the narrow line width laser light source 12; the coherent receiving end Rc 15 comprising a spot-size converted one-dimensional receiving array of sparse antenna pitch 201 and a coherent receiving module 204 along the propagation direction of the signal light reflected by the target and a reference light input waveguide 202, a second beam splitter module 203, and the coherent receiving module 204 along the propagation direction of reference light 18 provided by the narrow line width laser light source 12; the incoherent receiving end Ri 14 comprising a lens optical module of large numerical aperture 301 and a linear photodetector array 302 in sequence along the direction of the signal light reflected by the target 17. The high-speed integrated circuit controller 11 comprises two input ends and two output ends, wherein the output end of the coherent receiving module 203 in the coherent receiving end 15 is connected electrically with the first input end of the high-speed integrated circuit controller 11 for data processing; the output end of the linear photodetector array 302 is connected electrically with the second input end of the high-speed integrated circuit controller 11 for data processing; the driving circuits of the phase shifter array module 103 in the transmitting end 16, and the driving circuits of the coherent receiving module 203 in the coherent receiving end 15, are electrically connected with the two output end of the high-speed integrated circuit controller 11 for active phase compensation.

The embodiment of the three-dimensional scanning LiDAR based on one-dimensional optical phased arrays comprises three main parts, namely, the transmitting end Tx 16, the coherent receiving end Rc 15, and the incoherent receiving end Ri 14; the transmitting end 16 comprising a silicon-nitride-integrated input end 101, a silicon-nitride-integrated beam splitter module 102, a silicon-based phase shifter array module 103, and a silicon-based coupling suppressed one-dimensional transmitting array of sub-wavelength pitch 104, the coherent receiving end 15 comprising a silicon-based spot-size converted one-dimensional receiving array of sparse antenna pitch 201, a reference light input end 202, a silicon-nitride-integrated beam splitter module 203, and a silicon-based integrated coherent receiving module 204, the incoherent receiving end 14 comprising a lens optical module of large numerical aperture 301 and a linear photodetector array 302; electric control of the phase shifter in the silicon-based phase shifter array module 103 in the transmitting end 16 and signal processing of both the silicon-based coherent receiving module 203 of the coherent receiving end 15 and the linear photodetector array 302 of the incoherent receiving end 14 being realized by a high-speed integrated circuit controller module outside the integrated photonic chip system; the light source used by the system being able to be hybrid integrated with the chip system or provided by a separate external module according to performance and installation specifications.

Figure 2:
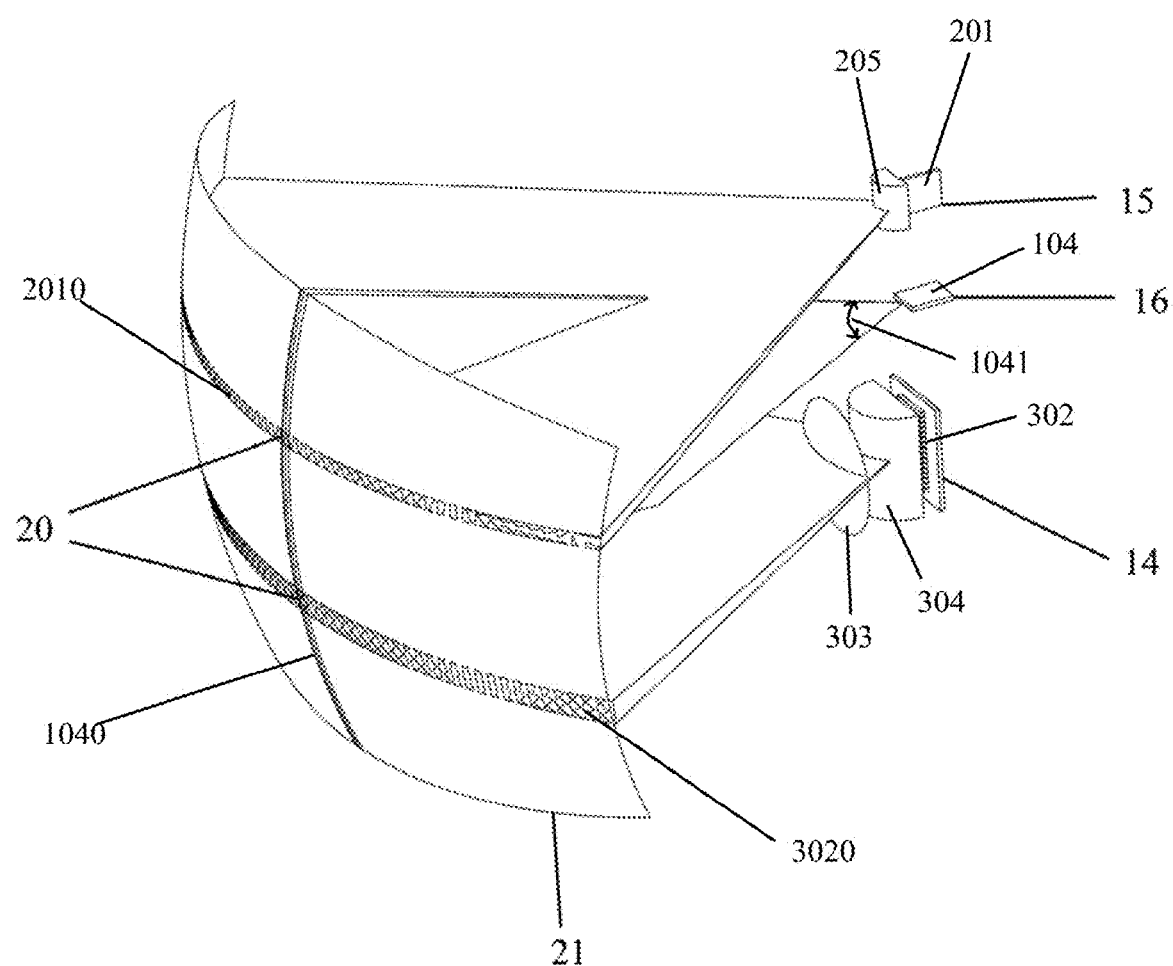
FIG. 2 is a 3D rendering of the system components as well as its operating principles in one embodiment of the present invention.

As shown in FIG. 2, detection light enters the free space from the one-dimensional phased array 104 in the transmitting end 16 arranged along the horizontal direction, interferes in the far field 21 and forms a beam 1040 in the elevation direction, at which time all targets in the field of view at the corresponding azimuth angle 1041 are illuminated and subsequently reflect the detection light back to the LiDAR system via diffuse reflection.

At the incoherent receiving end 14, the reflected signal light is focused via a large-aperture optical system formed by combining a spherical lens 303 and a cylindrical lens 304 and converges on a plane where the linear photodetector array 302 is located, wherein the focal plane corresponding to the spherical lens 303 (hereinafter referred to as a "focusing lens") coincides with the physical plane of the linear photodetector array 302, and the focal plane of the cylindrical lens 304 (hereinafter referred to as a "magnifying lens") with the convex surface placed along the sagittal direction is behind the plane of the linear photodetector array 302. Therefore, due to the Helmholtz reciprocity principle, as the linear photodetector array 302 is within the focal length of the magnifying lens 304, the array element forms an upright magnified virtual image on the saggital plane, thus extending the effective receiving length of the array element in the horizontal direction, which means that parallel light incident at different azimuth angles are received by the sensor array element to the greatest extent. Meanwhile, parallel light incident at different elevation angles are focused on different array elements by the focusing lens 303, and a convergence process in the sagittal plane is not influenced by the cylindrical lens 304, so that the incoherent receiving end 14 can distinguish parallel lights returned at different elevation angles in the field of view, the receiving area of each array element corresponds to one latitude line, while by arranging and extending the linear array 302 along the vertical direction, all the latitudes in the field of view are covered discretely.

At the coherent receiving end 15, the one-dimensional optical phased array 201 extending along the vertical direction is magnified into a square array with a larger receiving area by the cylindrical lens 205 with the convex surface placed along the sagittal direction with similar magnifying principle, wherein each array element is stretched into a receiving window which is of the same size in the vertical direction and magnified in the horizontal direction by a magnifying lens 205. Signal lights received from different array elements coherently combines with the reference lights, which are phase shifted in advance based on the current elevation angle, in the silicon-based coherent receiving module 204, and are output as photocurrents; due to the fact that parallel light incident at different elevation angles correspond to different array element phase relations, only echoes from the currently selected elevation angle, which are in constructive interference with the preset phase of the reference light of each channel, can be amplified by the reference light, and therefore directionally selective receiving can be realized. According to the Helmholtz reciprocity principle, each combination of preset phases of reference lights of the silicon-based coherent receiving module 204 corresponds to an elevation angle, and parallel lights returned in different elevation angles from the free space can be distinguished by changing the preset phase combinations. Although in this embodiment the coherent receiving end 15 and the transmitting end 16 shown in FIG. 2 are two separate chips, the coherent receiving end 15 and the transmitting end 16 can be monolithically integrated if the transceiving arrays formed by compact surface-transmitting grating couplers are orthogonally arranged according to the same specification.

For the LiDAR system described above, the actual target detected is in the intersection 20 of the azimuth angle 1041 determined by the transmitting end 16 and the elevation angle determined by the coherent receiving end 15. For the incoherent receiving end 14, at any instant during the azimuth scanning of the transmitting end 16, targets on different elevation angles along the whole azimuth beam are detected and ranged by different array elements of the linear photodetector array simultaneously, and direct detection with pulse-based time of flight measurement is performed. In one embodiment of the present invention, the number of the array elements and even the geometric distribution of the array elements in the incoherent receiving end 14 can be directly adopted from the top-end multi-line mechanical LiDARs that is commercially available. With those adopted configuration, the coarse scanning with relatively low elevation resolution can be achieved with high cost efficiency. For the coherent receiving end 15, since the one-dimensional receiving array 201 adopts a sparse design, elevation scanning with high resolution can be realized with relatively fewer array elements. In addition, if frequency modulated continuous wave (FMCW) detection scheme is adopted by the coherent receiving end 15, radial ranging precision can be improved at the same electric domain clock cost, and the maximum detection range can be further increased with reference light amplification. The only disadvantage is that since coherent detection is actually another form of average sampling, the radial refreshing rate is low, detection resources need to be maintained in the current detection direction during the radial ranging process, and the real-time performance of the angular refresh rate could be limited.

Figure 3:
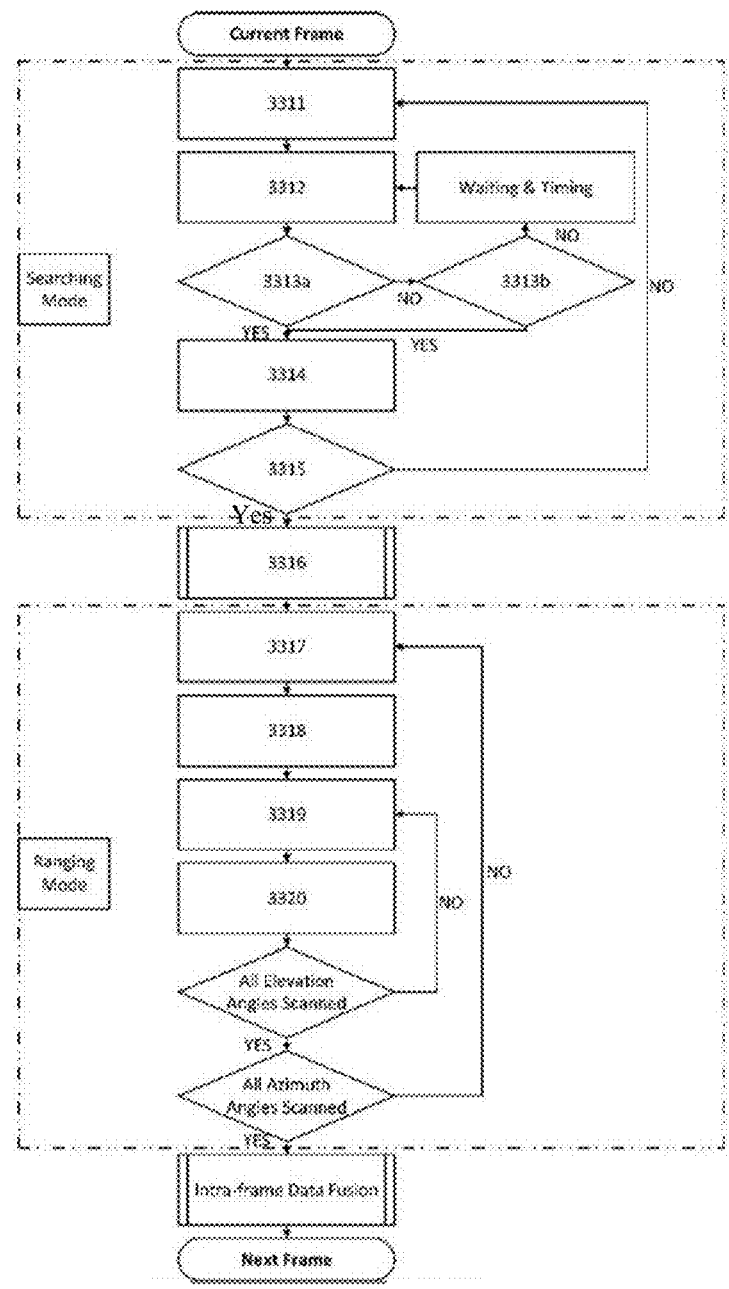
FIG. 3 is a flow diagram showing the fusion process of the incoherent and coherent detection solution employed in one embodiment of the present invention.

Therefore, in the embodiment, the incoherent and coherent detection solutions are fused as shown in FIG. 3: any frame consists of an incoherent searching frame and a coherent ranging frame. In the incoherent searching frame, continuous azimuth angle scanning is performed at the transmitting end. Taking the detection of a certain azimuth angle as an example, when echo pulses from all elevation angles have returned to the corresponding array elements or when the waiting time exceeds the round trip delay of the maximum ranging distance, the system will scan the next azimuth angle until the azimuth scanning covers the entire field of view. Thereby, the approximate distribution of targets in the field of view is obtained, and the master computer synchronously analyzes and records the targets which are critical to the automatic driving task in the scanning process. Based on the analysis results of the incoherent searching frame, the transmitting end and the coherent receiving end will carry out high-precision angular and radial ranging on the key target by means of randomly addressed discrete beam scanning, so as to fully exploit the advantages of optical phased array and coherent detection. Finally, the master computer performs data fusion on detection results of the searching frame and the ranging frame and synthesizes the fused data into the current frame. Obviously, it is also possible for the present embodiment to implement the speed measurement based on this fusion scheme, or to vary the number of searching frames and ranging frames in a detection frame.

Figure 4:
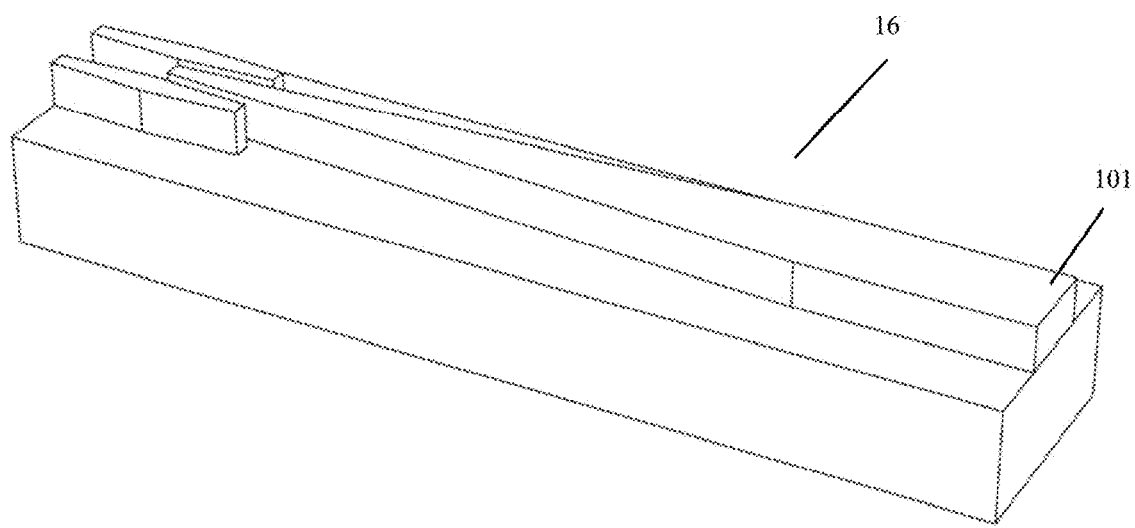
FIG. 4 illustrates a silicon-nitride-based input end-face coupler with trident structure adopted in an embodiment of the present invention.
Figures 5A, 5B:
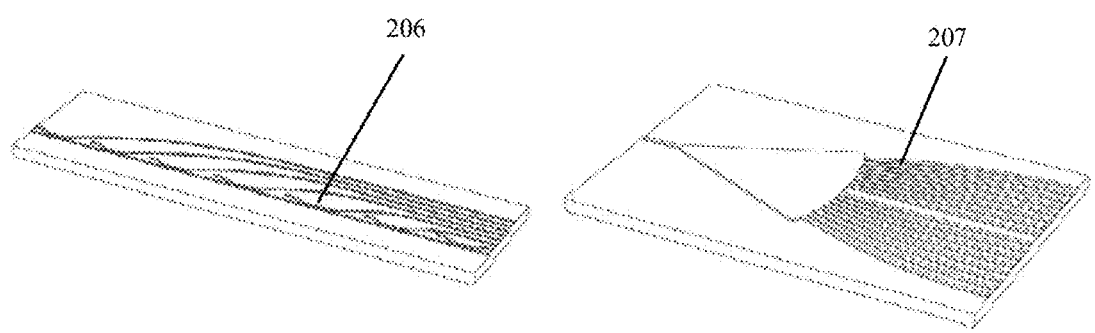

In the present invention, the embodiment adopts a silicon/silicon-nitride 3D integration platform and combines the advantages of high power tolerance of the silicon nitride waveguide and compact structure, small bending radius and rich modulation means of the silicon waveguide. After the high-power detection light enters the chip from the silicon nitride input end as shown in FIG. 4, the high-power detection light is subjected to power splitting by the silicon nitride beam splitter as shown in FIGS. 5A and 5B to the phased array sub-channel and then is conveyed to the silicon waveguide with lower power tolerance by the interlayer coupler.

In the present invention, the routing and layout of all the silicon waveguides or the silicon nitride waveguides in the 3D platform follows the specifications that adjacent layers are only used for interlayer coupling while crossings or routing adjacencies can only be implemented on every other layer, so that the interlayer coupling efficiency is improved, and crosstalk during signal routing is inhibited.

Figure 6A:
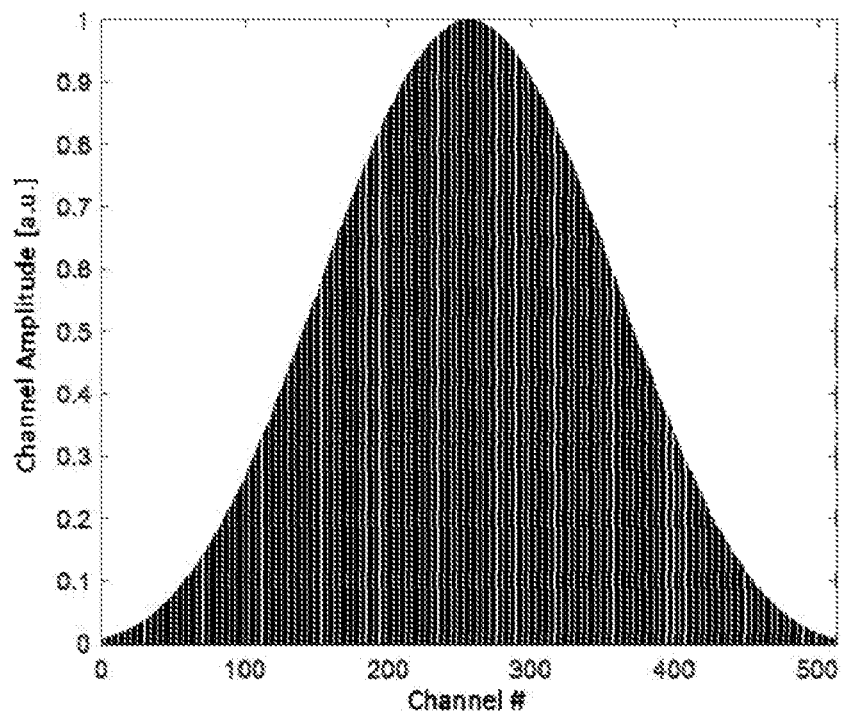
FIG. 6A shows channel amplitude distribution in the present invention, where a typical Taylor-Kaiser amplitude distribution is shown, with the horizontal axis being the channel number and vertical axis being the amplitudes (normalized)
Figure 6B:
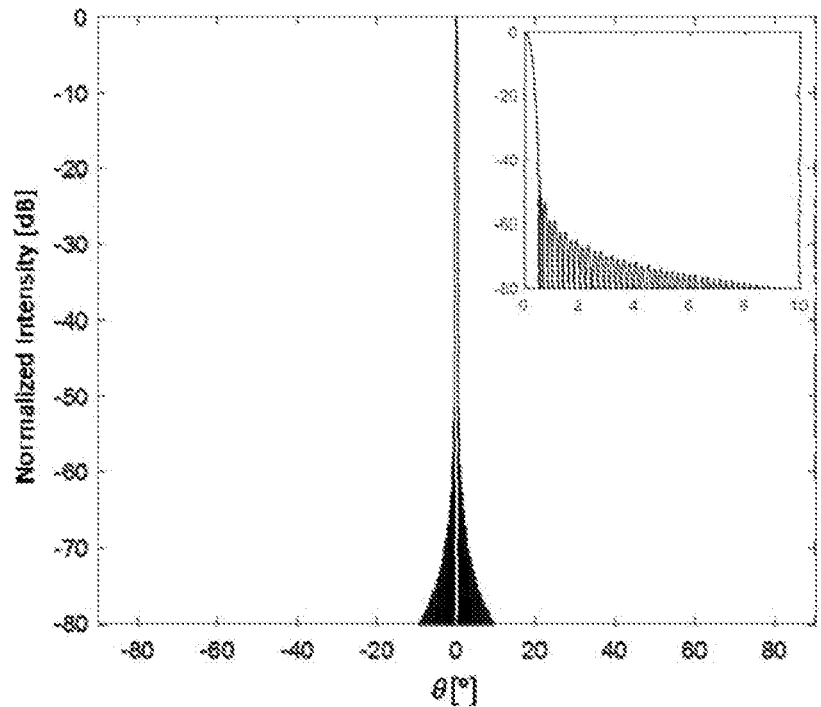
FIG. 6B shows the corresponding far field distribution, where the far field of a one-dimensional phased array employing the amplitude taper is shown, with the horizontal axis being the azimuth angle θ[°] and the vertical axis being the far field intensity distribution [dB].

In the present invention, since it is desirable that the transmitting end concentrates the radiated detection light energy onto the target, while aliasing due to interference from side lobes irradiating onto nearby targets at other azimuth angles should be avoided. In other words, a high energy concentration in the main lobe and a low side lobe level must be maintained over the entire field of view. In order to meet these requirements, based on the design practice from the RF phased arrays, the output array of the embodiment adopts a uniform array of sub-wavelength pitch, and the light wave amplitudes output by the array elements needs to follow the typical side lobe suppression distribution. In particular, for an array with a channel number N less than or equal to 64, the relevant structural parameters of the silicon nitride beam splitter in FIGS. 5A and 5B are modified so that the light wave amplitudes at the sub-channels are distributed according to Chebyshev distribution after power splitting, and when N is greater than 64, the light wave amplitude of the sub-channels are distributed according to Taylor-Kaiser distribution in the same manner. These two amplitude distributions are equivalent to the window function in Fourier transform, and can suppress the side lobe in the far field to a specific level required by aliasing-free detection within the operating distance while taking into account the divergence of the main lobe. The corresponding design effect is shown in FIGS. 6A and 6B.

Figure 7:
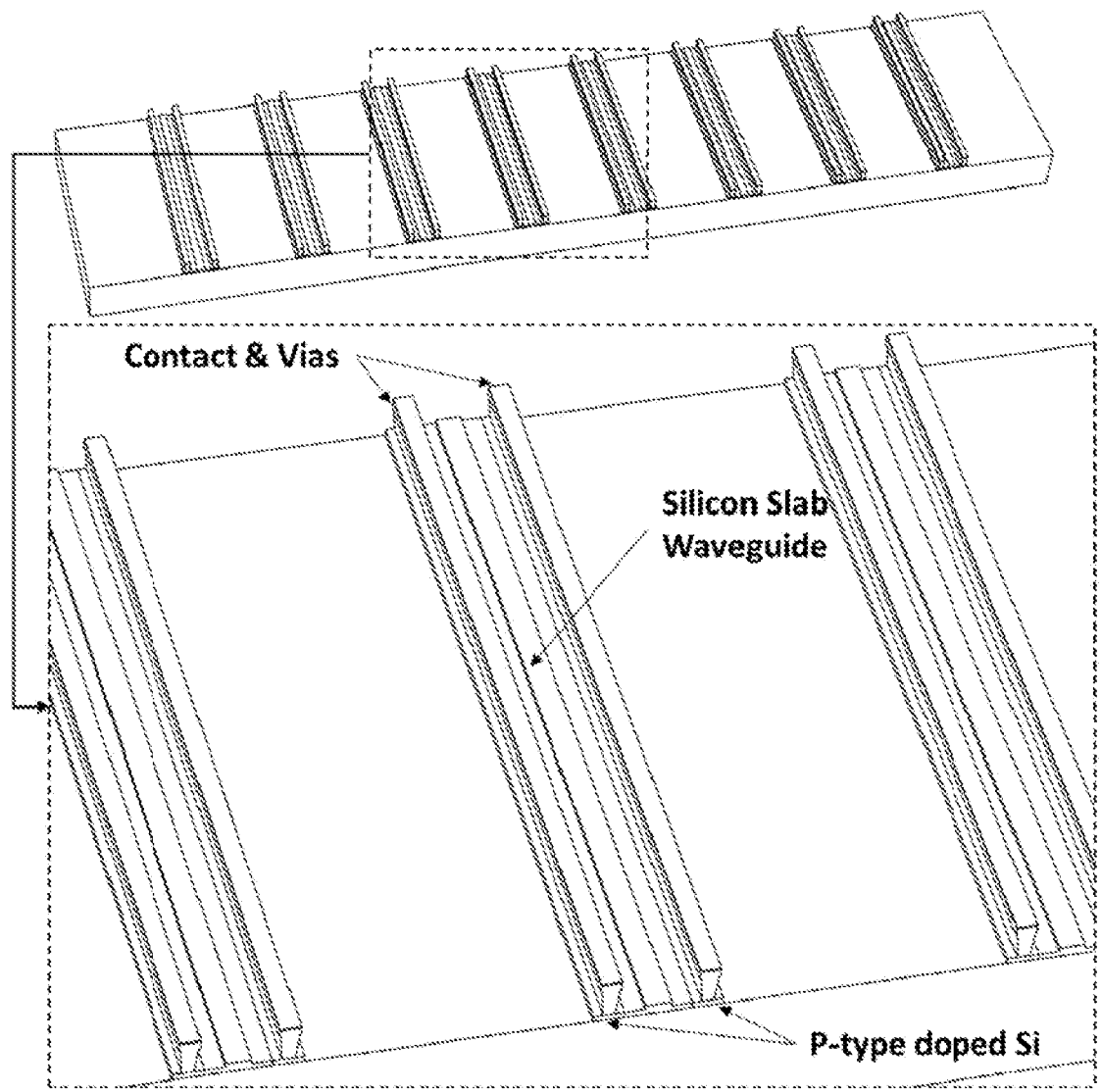
FIG. 7 shows the silicon-based p-i-p doped thermal-optical phase shifter array in one embodiment of the present invention.

In the present invention, the detection light which is subjected to power splitting and coupled into the silicon waveguide passes through the silicon-based p-i-p doped thermo-optic phase shifter array as shown in FIG. 7 (note that an n-i-n doped version is also feasible and practically the same design) and respectively undergoes different phase modulations, so that the detection light output by each array element satisfies the condition of constructive interference in the current azimuth scanning direction, and beam-forming is therefore realized.

Figure 8A:
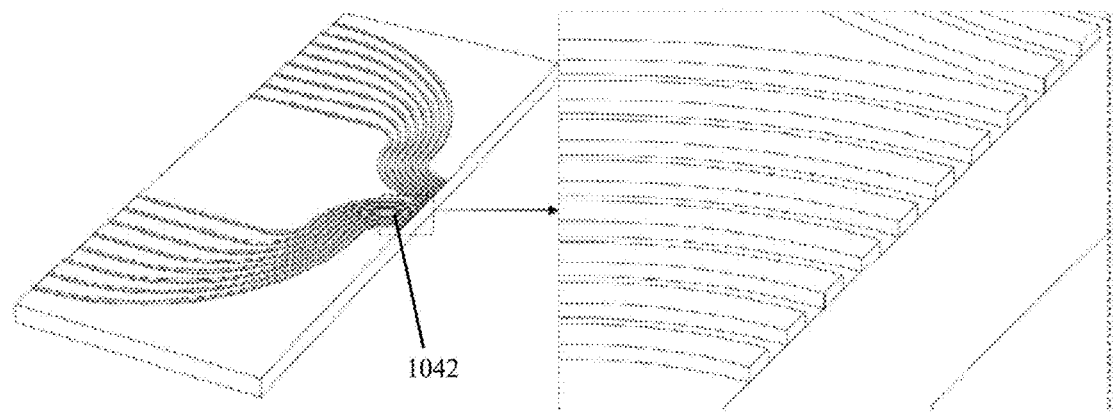
FIGS. 8A, 8B, and 8C show the structures of the silicon-based coupling suppressed transmitting arrays of sub-wavelength pitch in the embodiment of the present invention, wherein FIG. 8A adopts a curved waveguide array of different bend radius, FIG. 8B adopts an array of waveguides with alternatively changing widths, and FIG. 8C adopts dielectric metamaterial ribbons inserted between adjacent waveguides.
Figure 8B:
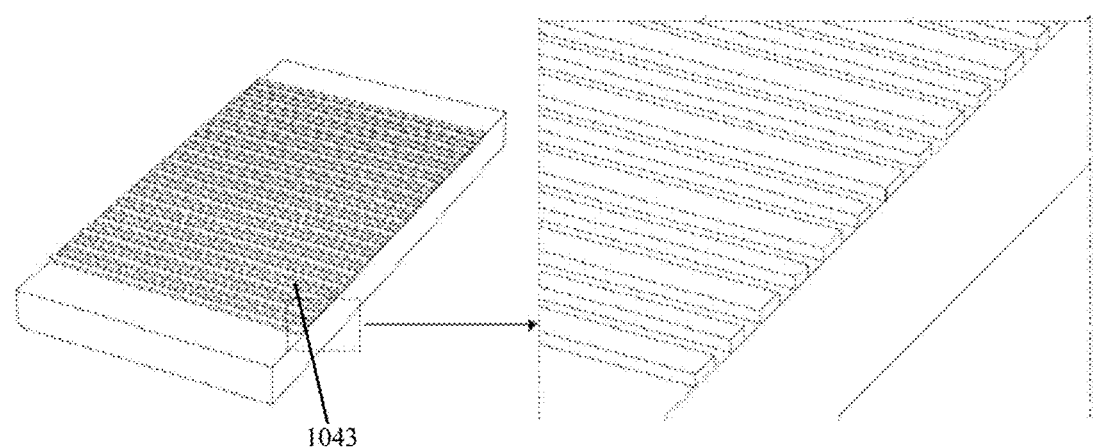
Figure 8C:
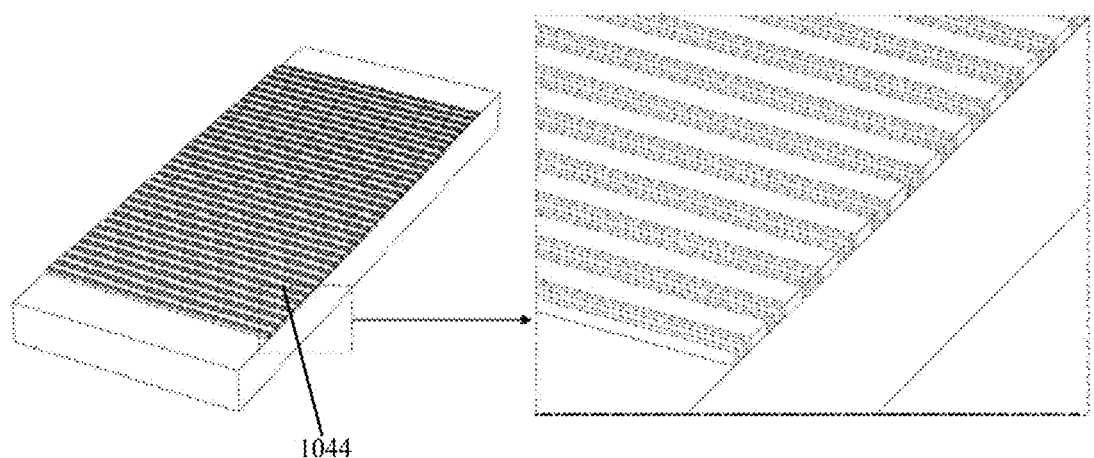

Based on the above solution, in order to suppress possible channel crosstalk between dielectric waveguides at sub-wavelength intervals, three coupling suppression means shown in FIGS. 8A to 8C need to be used in conjunction at the emission array at the transmitting end. In FIG. 8A, the bending radius of each channel in the curved waveguide array 1042 is different, so each channel possesses guided fundamental mode of different transmission constant. The mode mismatch among different channels undermines the coupling condition among the channels, and the coupling suppression is realized. However, with the increase of the number of channels in larger arrays, the bending radius will also increase significantly, and the difference of waveguide transmission constants will decrease as the bending radius increases and converges to the propagation constant corresponding to the fundamental mode in a straight waveguide. Therefore, the curved waveguide array cannot support the coupling suppression when the number of channels is relatively large. After the number of the channels N is larger than 64, for channels on the two sides of the array, coupling suppression can be realized with two symmetric wings of curved waveguide array structure of continuously changing radius, and for the central channel, the waveguide array structure with alternatively changing widths 1043 as shown in FIG. 8B can be used, so that the propagation constants of the guided fundamental modes of the adjacent channels are forced to be different, mode mismatch is again maintained, and inter-channel crosstalk is therefore suppressed; or finally as shown in FIG. 8C a silicon-based metamaterial structure 1044 is inserted between the waveguides, so that the evanescent field depth of the guided mode outside the geometric dimension of the waveguides is limited, and the evanescent field coupling is limited from the origin. It is worth noting that because the dielectric metamaterial structure generally needs 80 nm and finer process precision, when the process level does not satisfy the requirement or the cost pressure is remarkable, the waveguide suppression structure with alternatively changing widths can be mainly adopted in cooperation with the curved waveguide structure to realize coupling suppression.

In the present invention, although the cylindrical lens 205 is used to stretch the one-dimensional receiving array 201 in the horizontal direction, the receiving window corresponding to the array element of the receiving array 201 still needs to reach a certain area, and meanwhile, the receiving array 201 needs to have a large length in the vertical direction. Moreover, since the signal light returned from the target is an echo after diffuse reflection, the receiving array 201 has no requirement on the power concentration in the main lobe after coherent beam combination; however, the main lobe of the receiving array 201 still needs to maintain the sidelobe suppression required by the maximum aliasing-free detection distance. Taking into account both the directional selectivity of the receiving array 201, the required number of channels and the required crosstalk suppression between receiving windows of the array elements, a sparse design is desirable to strike a perfect balance. In one embodiment, a group of transmitting arrays of different non-uniform element geometry and amplitude taper interpolated to the geometric specification are firstly generated through randomization, and are then subjected to global optimization through a particle swarm algorithm. The optimal solution is finally adopted for the sparse receiving array design in the coherent receiving end and the corresponding modified reference light beam splitting structure. The schematic of the sparse array structure is shown in FIG. 9, the beam splitting structure is of the same in principle as shown in FIGS. 5A and 5B, while the specific parameters for implementation are different.

Figure 9:
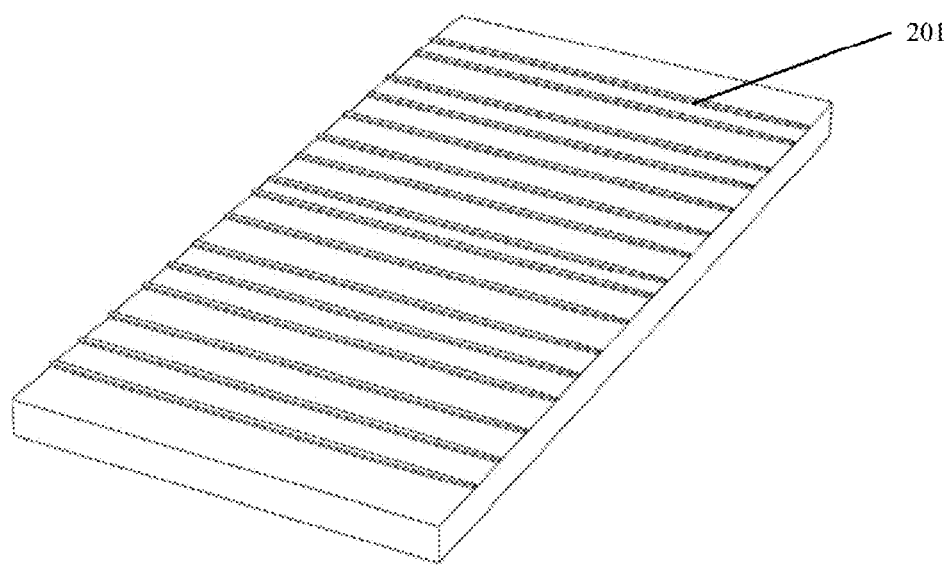
FIG. 9 shows the silicon-based spot-size converted one-dimensional receiving array of sparse antenna pitch in one embodiment of the present invention.

In the present invention, in order to enlarge the receiving window of the receiving array element, a spot size conversion structure at the end of the array elements in FIG. 9 is adopted to gradually compress the geometric dimension of the waveguide, so that the optical mode is gradually expanded and eventually possesses polarization-independent characteristics, and the basic principle is similar to that of an inverted taper structure commonly used in endfire coupling, which is not described in detail herein.

Figure 10:
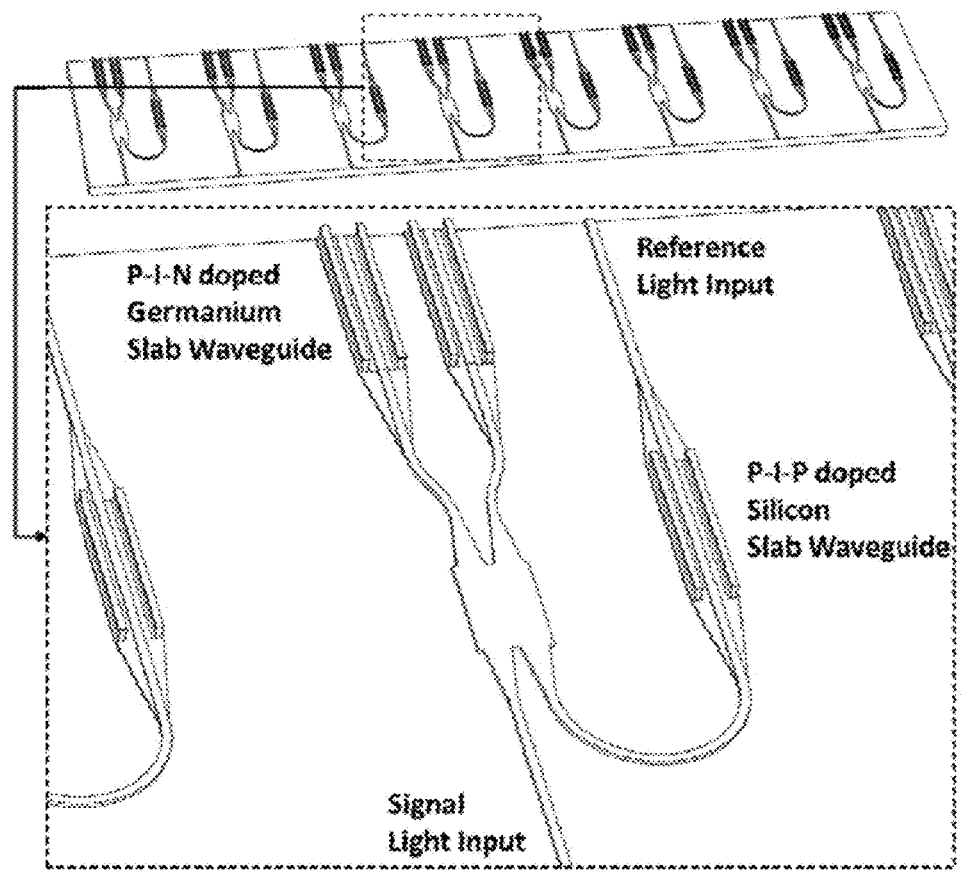
FIG. 10 shows the structure of a coherent receiving array in one embodiment of the present invention with a partially enlarged view.

Based on the above solution, the silicon-based coherent detection structure of the coherent receiving end 15 adopts a germanium-silicon balanced detection structure as shown in FIG. 10, and the specific principle is similar to that of the typical balanced detector. In addition, the improvement to the electric domain bandwidth of the balanced detection structure can be realized by adding an on-chip capacitor and an on-chip inductor for impedance matching, and the related techniques and principles are general techniques in the public domain, which are not described in detail herein.

In the present invention, the applied optical system used by the incoherent receiving end, the avalanche photodiode array, and the pulse width modulation, the required transimpedance amplifier chip, the control and signal processing circuit, the master computer and other means or devices used in the LiDAR system are common technologies. Relevant devices are all commercially available from mainstream semiconductor manufacturers and can be customized if necessary through dedicated process flow.

In the present invention, a separate external light source and a high-power optical fiber which are optional to the system are common technologies, and a III-V/Si external cavity laser formed by hybrid integration has a plurality of typical implementation means both on a silicon platform, a silicon-nitride platform or on a silicon/silicon-nitride 3D integration platform belongs to the common technologies. The present invention and the embodiments thereof can form an active LiDAR system by combining with the relevant designs In the present invention, since each component is a linear array, the control complexity is low, the performance of the three-dimensional scanning LiDAR system can be further improved by adding a plurality of groups of similar devices and carrying out multi-chip collaboration, such as aperture synthesis and data fusion which are common technologies and are not described in detail herein.

It will be readily understood by institute or industry personnel skilled in the art that the foregoing is a preferred embodiment of the present invention and is not intended to limit the present invention. Any modification, equivalent replacement and improvement made within the spirit and principle of the present invention shall be included in the protection scope of the present invention.

We claim:

1. A three-dimensional scanning LiDAR based on one-dimensional optical phased arrays, comprising
    a narrow line width laser light source (12),
    a high-speed integrated circuit controller (11), wherein the high-speed integrated circuit controller (11) comprises a first input end, a second input end, and two output ends, and
    a chip system, wherein the chip system is an integrated optical chip system that comprises a transmitting end (16), a coherent receiving end (15), and an incoherent receiving end (14),
    wherein the transmitting end (16) further comprises a detection light input waveguide (101), a first beam splitter module (102), a phase shifter array module (103), wherein the phase shifter array module (103) comprises driving circuits and N channels, and a coupling suppressed one-dimensional transmitting array with sub-wavelength pitch (104) with N channels, wherein the detection light input waveguide (101), the first beam splitter module (102), the phase shifter array module (103), and the coupling suppressed one-dimensional transmitting array of sub-wavelength pitch (104) are sequentially arranged along a propagation direction of a detection light emitted from the narrow line width laser light source (12),
    the coherent receiving end (15) further comprises a spot-size converted one-dimensional receiving array of sparse antenna pitch (201), wherein the spot-size converted one-dimensional receiving array of sparse antenna pitch (201) comprises sparse antenna pitches, a reference light input waveguide (202), a second beam splitter module (203), and a coherent receiving module (204), wherein the coherent receiving module (204) comprises an output end and driving circuits, and wherein the spot-size converted one-dimensional receiving array of sparse antenna pitch (201) and the coherent receiving module (204) are sequentially arranged along a propagation direction of a signal light reflected from a target; and the reference light input waveguide (202), the second beam splitter module (203), and the coherent receiving module (204) are sequentially arranged along a propagation direction of a reference light emitted from the narrow line width laser light source (12),
    the incoherent receiving end (14) further comprises a lens optical module (301), wherein the lens optical module (301) comprises a large numerical aperture, and a linear photodetector array (302), wherein the linear photodetector array (302) comprises an output end, and the lens optical module (301) and the linear photodetector array (302) are sequentially arranged along the propagation direction of the signal light reflected from the target, wherein the output end of the coherent receiving module (204) in the coherent receiving end (15) is connected electrically with the first input end of the high-speed integrated circuit controller (11) for data processing; the output end of the linear photodetector array (302) is connected electrically with the second input end of the high-speed integrated circuit controller (11) for data processing;

the driving circuits of the phase shifter array module (103) in the transmitting end (16) and the driving circuits of the coherent receiving module (204) in the coherent receiving end (15) are electrically connected with the output ends of the high-speed integrated circuit controller (11), respectively, for active phase compensation; and wherein the coupling suppressed one-dimensional transmitting array with sub-wavelength pitch (104) is arranged along horizontal direction and performs one-dimensional linear scanning in a direction within an azimuth angle (1041), and a directional beam (1040) obtained by interference of the coupling suppressed one-dimensional transmitting array with sub-wavelength pitch (104) is a strip beam along an elevation direction; and at same time, the spot-size converted one-dimensional receiving array with sparse antenna pitch (201) and the linear photodetector array (302) are both arranged along vertical direction, and both the spot-size converted one-dimensional receiving array with sparse antenna pitch (201) and array elements of the linear photodetector array (302) are directional selective in strip areas (2010, 3020) along latitude direction, the spot-size converted one-dimensional receiving array with sparse antenna pitch (201) performs one-dimensional linear scanning in an elevation angle direction, the linear photodetector array (302) simultaneously receives and distinguishes echoes in all elevation angle directions to realize three-dimensional scanning.

2. The three-dimensional scanning LiDAR as described in claim 1, wherein the narrow line width laser light source (12) is co-integrated with the chip system, and the high-speed integrated circuit controller is 3D integrated with the chip system.

3. The three-dimensional scanning LiDAR as described in claim 1, wherein the detection light emitted from the narrow line width laser light source (12) enters the chip system through the detection light input waveguide (101), passes through the first beam splitter module (102) and is distributed into N channels of waveguides by the first beam splitter module (102);

then the detection light passes through the N channels of the phase shifter array (103) and leaves the transmitting end (16) from the N-channels of the coupling suppressed one-dimensional transmitting array with sub-wavelength pitch (104), and enters free space to irradiate the target, and N is greater than or equal to 4, and the coupling suppressed one-dimensional transmitting array with sub-wavelength pitch (104) is a uniform array, the sub-wavelength pitch is a value between one half of an operating wavelength to one full length of the operating wavelength and determined by the number of the N channels and scanning range, and the operating wavelength is in a range of from 1500 nm to 1600 nm.

4. The three-dimensional scanning LiDAR as described in claim 1, wherein in the coherent receiving end (15), the reference light emitted from the narrow line width laser light source (12) enters the chip system from the reference light input waveguide (202), and amplitude of the reference light is distributed into M channels of waveguides by the second beam splitter module (203), amplitudes in the channels are obtained through interpolation with respect to geometric relation of array elements the spot-size converted one-dimensional receiving array of sparse antenna pitch (201) comprises M channels, and the signal light reflected by the target enters the chip system by being coupled through the M channels of the spot-size converted one-dimensional receiving array of sparse antenna pitch (201), the reference light through the M channels of the waveguides from the second beam splitter module (203) and the signal light through the M channels of the spot-size converted one-dimensional receiving array of sparse antenna pitch (201) are subjected to photo detection in the coherent receiving module (204) to generate an electric signal containing distance information on the target, and M is greater than or equal to 4, the spot-size converted one-dimensional receiving array of sparse antenna pitch (201) is of non-uniform pitch.

5. The three-dimensional scanning LiDAR as described in claim 1, wherein at the incoherent receiving end (14), the signal light reflected from the target passes through the lens optical module (301) to enter the incoherent receiving end (14) and is focused onto a plane where the linear photodetector array (302) is located and respectively received by the linear photodetector array (302).

6. The three-dimensional scanning LiDAR as described in claim 1, wherein the first beam splitter module (102) is either an array of cascaded directional couplers (206) or a star coupler (207).

7. The three-dimensional scanning LiDAR as described in claim 1, wherein phase shifters in the phase shifter array module (103) and the coherent receiving module (204) adopt thermally or electro-optically modulated phase shifters.

8. The three-dimensional scanning LiDAR as described in claim 1, wherein the coupling suppressed one-dimensional transmitting array with sub-wavelength pitch (104) is either a curved waveguide array structure (1042), a waveguide array structure with alternatively changing widths (1043), or a structure with metamaterial ribbons inserted between the waveguides (1044) to suppress coupling so as to realize sub-wavelength pitch arrangement.

9. The three-dimensional scanning LiDAR as described in claim 1, wherein the spot-size converted one-dimensional receiving array with sparse antenna pitch (201) comprises an inverted taper structure where a geometric dimension of the inverted taper structure shrinks from a standard rectangular waveguide to a tip of square cross-section structure, and a geometric dimension of a guided mode is gradually expanded to become polarization insensitive with increased effective receiving area.

10. The three-dimensional scanning LiDAR as described in claim 1, wherein the coherent receiving module (204) simultaneously receives the reference light and the signal light by using a balanced detector, performs matched phase shift on the reference light, sends output electrical signal to a signal processing module to retrieve information of the target.

11. The three-dimensional scanning LiDAR as described in claim 1, wherein the transmitting end (16) and the coherent receiving end (15) are monolithically or hybrid integrated.

12. The three-dimensional scanning LiDAR as described in claim 1, wherein the linear photodetector array (302) performs photoelectric detection using an array of single-photon avalanche diodes.

13. The three-dimensional scanning LiDAR as described in claim 3, wherein N is less than or equal to 64, and light wave amplitudes in the N channels of the waveguides are distributed by the first beam splitter module (102) according to Chebyshev distribution.

14. The three-dimensional scanning LiDAR as described in claim 3, wherein N is greater than 64, and the light wave amplitudes in the N channels of the waveguides are distributed by the first beam splitter module (102) according to Taylor-Kaiser distribution.

15. The three-dimensional scanning LiDAR as described in claim 4, wherein M is less than or equal to 64, and the amplitude of the reference light is distributed into the M channels of the waveguides by the second beam splitter module (203) according to Chebyshev distribution.

16. The three-dimensional scanning LiDAR as described in claim 4, wherein M is greater than 64, and the amplitude of the reference light is distributed into the M channels of the waveguides by the second beam splitter module (203) according to Taylor-Kaiser distribution.

17. The three-dimensional scanning LiDAR as described in claim 1, wherein the second beam splitter module (203) is either an array of cascaded directional couplers (206) or a star coupler (207).

18. The three-dimensional scanning LiDAR as described claim 4, further comprising
a cylindrical lens (205),
wherein the cylindrical lens (205) comprises a curved surface in a direction perpendicular to the direction of the spot-size converted one-dimensional receiving array of sparse antenna pitch (201) in a receiving area of the coherent receiving end (15).

* * * * *